United States Patent [19]

Buck

[11] 3,801,363
[45] Apr. 2, 1974

[54] METHOD FOR METALIZING CERAMIC

[75] Inventor: Robert W. Buck, Wheat Ridge, Colo.

[73] Assignee: Coors Porcelain Company, Golden, Colo.

[22] Filed: Feb. 7, 1972

[21] Appl. No.: 224,337

Related U.S. Application Data

[62] Division of Ser. No. 11,869, Feb. 16, 1970, Pat. No. 3,661,595.

[52] U.S. Cl............. 117/160 R, 117/38, 117/169 A
[51] Int. Cl.......................... B44d 1/46, C04b 41/14
[58] Field of Search....... 117/22, 123 B, 135.1, 160, 117/169 A; 106/1; 252/512

[56] References Cited
UNITED STATES PATENTS

| | | | |
|---|---|---|---|
| 2,878,554 | 3/1959 | Long.................................... | 117/22 |
| 3,023,492 | 3/1962 | Bristow.............................. | 117/123 |
| 3,537,888 | 11/1970 | Schwyn................................. | 106/1 |
| 3,620,799 | 11/1971 | Hoelscher............................ | 117/22 |

*Primary Examiner*—William D. Martin
*Assistant Examiner*—Sadie L. Childs
*Attorney, Agent, or Firm*—Reising, Ethington & Perry

[57] ABSTRACT

The subject matter of this invention is a composition and method for metalizing ceramic wherein the composition is a mixture containing manganese, molybdenum and silicon, at least a portion of the latter being present as molybdenum disilicide or tungsten disilicide, molybdenum disilicide being much preferred. The mixture, in powdered form, is suspended in an organic vehicle to provide a slurry which is coated onto the ceramic after which the ceramic is fired in a wet reducing atmosphere to a temperature of about 1,150° to 1,450°C, the organic vehicle vaporizing during the initial phase of the firing operation. By inclusion of the disilicide in the mixture an improved metalized surface on the ceramic can be accomplished using relatively a low firing temperature.

4 Claims, No Drawings

METHOD FOR METALIZING CERAMIC

This application is a division of patent application Ser. No. 11,869, filed Feb. 16, 1970, now U.S. Pat. No. 3,661,595.

This invention relates to an improved composition and method for metalizing ceramics and more particularly to an improved composition and method for applying to ceramic a metalized surface of the so-called moly-manganese type.

It is well known that ceramic can be provided with a metalized surface by applying to the ceramic a powdered mixture of manganese, molybdenum and silica, i.e., silicon dioxide, and then firing the ceramic to a temperature upwards of about 1,400°C. During firing the silica reacts with the manganese and with surface portions of the ceramic whereby the resulting metallic surface layer is strongly bonded to the ceramic. Metalized ceramics find wide utility as electronics components where selected areas of electrical conductivity are required on the surface of the ceramic and also as mechanical assembly components wherein a metal member, such as for a seal, is braised to the metalized surface of the ceramic.

It is an object of the present invention to provide an improved ceramic metalizing composition which enables the manufacture of extremely high quality metalized ceramic bodies at relatively low firing temperatures and hence at reduced costs and yet with assurance of optimum bond strength between the metallic layer and the ceramic. Another and attendant object of the invention is the provision of an improved method for metalizing ceramics.

Briefly, these objects are accomplished in accordance with the invention by a metalizing composition containing powdered manganese and powdered molybdenum and wherein silicon is present in the form of a disilicide of molybdenum or tungsten, preferably the former. The preferred metalizing composition consists essentially of a mixture of manganese, molybdenum and molybdenum disilicide. The mixture of these powders is formed into a slurry with a suitable organic vehicle for ease in applying the mixture to the surface of the ceramic, the organic vehicle being such that it vaporizes during the subsequent firing operation without leaving any residue. After the slurry is applied to the ceramic, the ceramic is fired in a wet reducing atmosphere preferably at a temperature of from about 1,150° to 1,300°C. though a higher firing temperature can be used if desired. By incorporating silicon in the composition in the form of a disilicide, preferably molybdenum disilicide, improved bond strength and overall quality control during manufacture can be accomplished at relatively low firing temperatures, all to the end that the final metalized ceramic products can be made more simply and with reduced costs and with minimum scrap loss. It is theorized that the improved results stem from the extremely high reactivity of the silica and molybdenum which are formed in situ during firing from the reaction of the disilicide with the water vapor present in the firing atmosphere. That is, during the firing operation two reactions occur, one being the reaction of the disilicide with water to produce elemental molybdenum and silica, both highly reactive, and the second reaction being that of the silica with the manganese and with surface portions of the ceramic to produce a glassy phase monolithic with the ceramic. Because of the high reactivity of the silica, the latter reaction occurs and can be accomplished to completion at a relatively low temperature as compared with the temperature required when the metalized composition incorporates silica as such or in one of its other forms. The high reactivity of the molybdenum enhances the sintering of the molybdenum matrix. But whatever the reason, the fact is that by incorporating silicon in the composition as a disilicide as aforesaid, the desired reaction can be accomplished at a lower firing temperature which in turn means that there can be cost savings and improved quality control.

The above and other objects, features and advantages of the invention will appear more clearly from the following detailed description thereof and of a most preferred embodiment.

The mixture of powdered ingredients should preferably contain from 2 to 30 percent by weight manganese, from 40 to 90 percent by weight molybdenum and from 2 to 20 percent by weight silicon. As indicated above, it is preferred that all the silicon be present as the disilicide, ideally molybdenum disilicide, though it is within the purview of the invention to include some of the silicon as silica. Tungsten disilicide can be used in place of some or all of the molybdenum disilicide but this is generally disadvantageous due to the higher temperature that is required to sinter tungsten. Best results can be accomplished with a powder mixture consisting essentially of about 4 to 40 percent molybdenum disilicide, 2 to 30 percent elemental manganese and 40 to 90 percent elemental molybdenum. In general, the higher the silica or glass content of the ceramic being metalized, the less the percentage of total silicon, and also manganese, required in the metalizing mixture in order to obtain optimum results.

The powdered ingredients of the mixture should preferably all be of a grain size no greater than about 325 mesh (Tyler) i.e., 325 mesh.

Any of a wide variety of organic vehicles can be used for suspending the powder ingredients to form a slurry for a simple application of the metalizing composition to the ceramic. Of course the vehicle should be such as to completely vaporize during the early stages of the firing operation and without leaving any residue. Generally the organic vehicle should be an oil, such as pine oil, or a solid polymer, such as polymethylmethacrylate, dissolved in an organic solvent such as butyl carbitol. After the slurry is coated onto the ceramic and any solvent present evaporated, there remains an adherent coating of a mixture of the powder ingredients and the organic binder.

The following specific example of a preferred embodiment will serve to further illustrate:

A mixture is prepared with the following ingredients in the proportions indicated:

372 grams molybdenum powder, — 325 mesh
34 grams manganese powder, — 325 mesh
94 grams molybdenum disilicide powder, — 325 mesh
15 grams polymethylmethacrylate dissolved in 120cc. butyl carbitol.

The uniform mixture can best be accomplished by ball milling after which the viscosity of the resultant slurry can be adjusted to that desired by evaporation or addition of butyl carbitol. The desired viscosity will depend on the precise details of the silk screening or other technique to be used in applying the slurry to the ceramic, all as well known in the ceramic metalizing art.

The slurry is then coated onto the ceramic, as by silk screening, and the coated ceramic fired at a temperature of 1,170°C. for about 30 minutes in a wet reducing atmosphere of 25 percent hydrogen - 75 percent nitrogen, dewpoint nominally 20°C. The resultant metalized layer has an extremely high bond strength with the ceramic, the measured tensile strength being about 14,500 PSI.

The composition and method of this invention can be used for metalizing any of a wide variety of ceramics but find particular utility for metalizing sintered alumina base or beryllia base ceramics, i.e., ceramics of 100 percent alumina or beryllia or containing upwards of about 85 percent by weight alumina or beryllia, as the case may be, and with the remaining ingredients being either mineralizers, such as chromium oxide, or silica and fluxes, such as the alkaline earth metal oxides, which provide a glassy phase.

It is understood that while the invention has been described specifically with reference to a preferred embodiment thereof various changes may be made all within the full and intended scope of the claims which follow.

I claim:

1. A method for metallizing ceramic including the steps of applying to the ceramic a slurry of a powder mixture in a vaporizable organic vehicle, said powder mixture comprising from about 40 to 90 percent by weight molybdenum, from about 2 to 30 percent by weight manganese and from about 2 to 20 percent by weight silicon, at least a portion of said silicon being present as a material selected from the group consisting of molybdenum disilicide and tungsten disilicide; and thereafter firing said coated ceramic in a wet reducing atmosphere at a temperature of at least about 1,150°C.

2. A method as set forth in claim 1 wherein substantially all of the silicon in said mixture is present in the form of molybdenum disilicide.

3. A method as set forth in claim 1 wherein said mixture consists essentially of from about 4 to 40 percent by weight molybdenum disilicide, from about 2 to 30 percent by weight elemental manganese and from about 40 to 90 percent by weight elemental molybdenum.

4. A method as set forth in claim 3 wherein the coated ceramic is fired at a temperature of from about 1,150° to 1,300°C.

* * * * *